(12) United States Patent
Udagawa

(10) Patent No.: US 8,818,649 B2
(45) Date of Patent: Aug. 26, 2014

(54) ROTATION CONTROL DEVICE FOR WORKING MACHINE

(75) Inventor: Tsutomu Udagawa, Tokyo (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 196 days.

(21) Appl. No.: 13/379,325

(22) PCT Filed: Jun. 24, 2010

(86) PCT No.: PCT/JP2010/060754
§ 371 (c)(1),
(2), (4) Date: Dec. 19, 2011

(87) PCT Pub. No.: WO2010/150846
PCT Pub. Date: Dec. 29, 2010

(65) Prior Publication Data
US 2012/0101696 A1    Apr. 26, 2012

(30) Foreign Application Priority Data

Jun. 25, 2009    (JP) .................................. 2009-151379

(51) Int. Cl.
| | |
|---|---|
| *E02F 9/20* | (2006.01) |
| *H02P 29/00* | (2006.01) |
| *G06F 19/00* | (2011.01) |
| *E02F 9/12* | (2006.01) |
| *H02P 23/00* | (2006.01) |

(52) U.S. Cl.
CPC .............. *E02F 9/123* (2013.01); *E02F 9/2037* (2013.01); *H02P 23/0036* (2013.01); *H02P 29/00* (2013.01)
USPC .............................................. 701/50; 37/379

(58) Field of Classification Search
None
See application file for complete search history.

(56) References Cited

U.S. PATENT DOCUMENTS

| | | | |
|---|---|---|---|
| 5,714,719 A * | 2/1998 | Otsuka et al. ............... 177/25.11 |
| 2006/0276948 A1* | 12/2006 | Toda ............................... 701/50 |
| 2008/0082240 A1 | 4/2008 | Kagoshima et al. | |
| 2008/0164832 A1 | 7/2008 | Kawaguchi et al. | |
| 2009/0055056 A1* | 2/2009 | Ooki et al. ........................ 701/50 |
| 2009/0097986 A1* | 4/2009 | Nakata et al. ................. 417/44.2 |
| 2011/0029206 A1* | 2/2011 | Kang et al. ....................... 701/50 |

FOREIGN PATENT DOCUMENTS

| | | | |
|---|---|---|---|
| JP | 2001-10783 A | | 1/2001 |
| JP | 2003-33063 A | | 1/2003 |
| JP | 2004-35199 | * | 2/2004 |
| JP | 2008-88659 A | | 4/2008 |
| WO | WO 2006/054582 A1 | | 5/2006 |
| WO | WO2009/144782 A1 | * | 12/2009 |

OTHER PUBLICATIONS

International Search Report dated Sep. 21, 2010 including English-language translation (Four (4) pages).

* cited by examiner

*Primary Examiner* — Michael J Zanelli
(74) *Attorney, Agent, or Firm* — Crowell & Moring LLP (57) ABSTRACT

A working machine swing control system is provided with an actual rotation speed sensor and a controller. The actual rotation speed sensor senses an actual rotation speed of a swing motor. The controller controls a drive torque of a drive unit, which drives the swing motor, such that a difference between a target rotation speed outputted from a swing control device and the actual rotation speed outputted from the actual rotation speed sensor is reduced to zero. The swing control system includes a correction device for correcting the target rotation speed outputted from the swing control device according to a work posture of working equipment and a work load on the working equipment.

7 Claims, 5 Drawing Sheets

ROTATION CONTROL DEVICE FOR WORKING MACHINE

TECHNICAL FIELD

The present invention relates to a swing control system for a working machine, such as a hydraulic excavator, having an upperstructure retatable by a swing motor and working equipment attached to the upperstructure.

BACKGROUND ART

As conventional technologies of this kind, there are those disclosed in JP-A-2001-10783 and JP-A-2003-33063. Disclosed in JP-A-2001-10783 or JP-A-2003-33063 is a swing control system to be arranged on a hydraulic excavator, that is, a working machine having an upperstructure, working equipment attached to the upperstructure and including a boom, arm and the like, an electric motor as a swing motor for rotating the upperstructure, a drive unit for driving the swing motor, and a swing control device for outputting a target rotation speed for the swing motor, said target rotation speed corresponding to a control stroke of the swing control device. The swing control systems disclosed in these documents are each provided with an actual rotation speed sensor for sensing an actual rotation speed of the swing motor and a control means for controlling a drive torque of the drive unit such that a difference between the target rotation speed outputted from the swing control device and an actual rotation speed outputted from the actual rotation speed sensor is reduced to zero. Owing to this construction, the drive torque of the drive unit is controlled by the control means such that the rotation speed of the swing motor, in other words, the rotation speed of the upperstructure becomes one commensurate with the target rotation speed, in other words, target swing speed outputted corresponding to the control stroke of the swing control device.
JP-A-2001-10783
JP-A-2003-33063

DISCLOSURE OF THE INVENTION

Problem to Be Solved by the Invention

In the above-described conventional technologies disclosed in JP-A-2001-10783 and JP-A-2003-33063, there is constituted a swing system of good controllability that the actual rotation speed of the swing motor, in other words, the actual swing speed follows the target rotation speed, that is, the target swing speed. In a working machine such as, for example a hydraulic excavator, however, it is not always good to rotate the upperstructure, on which an operator's cab is arranged, precisely at a swing speed corresponding with high accuracy to a control stroke of the swing control device.

Depending, for example, on the posture of working equipment such as a front working mechanism in a hydraulic excavator, the moment of inertia of an upperstructure may vary considerably so that a different acceleration feel may be obtained. Upon performing suspending work by the working equipment, a different acceleration feel may also be obtained due to a difference in the weight of a suspended load, in other words, in work load. In a situation that an acceleration feel varies considerably as described above, a drive torque for a target rotation speed quickly arises, for example, when a control lever of a swing control device is manipulated to large extent or quickly. If the upperstructure rotates at a swing speed corresponding with high accuracy to a control stroke of the swing control device as in the above-described conventional technologies, the swing speed becomes so high that a shock is produced at start-up. An operator who has manipulated the swing control device in the operator's cab arranged on the upperstructure, therefore, experiences an odd feel, so that the ease in operation may be deteriorated, or upon performing suspending work by the working equipment, swaying of a suspended load may become substantial to induce a deterioration in work performance.

With the foregoing circumstances of the conventional technologies in view, the present invention has as an object thereof the provision of a swing control system for a working machine, which can realize swing control with a work posture of working equipment or a work load on the working equipment being taken into account.

Means for Solving the Problem

To achieve this object, a swing control system according to the present invention for a working machine having an upperstructure, working equipment attached to the upperstructure, a swing motor for rotating the upperstructure, a drive unit for driving the swing motor, and a swing control device for outputting a target rotation speed for the swing motor, said target rotation speed corresponding to a control stroke of the swing control device, is to be arranged on the working machine and is provided with an actual rotation speed sensor for sensing an actual rotation speed of the swing motor and a control means for controlling a drive torque of the drive unit such that a difference between the target rotation speed outputted from the swing control device and the actual rotation speed outputted from the actual rotation speed sensor is reduced to zero. The swing control system is characterized in that it is provided with a correction means for correcting the target rotation speed, which has been outputted from the swing control device, based on a drive torque of the drive unit as corrected according to at least one of a work posture of the working equipment and a work load on the working equipment.

According to the present invention constructed as described above, the target rotation speed for the swing motor as outputted from the swing control device is corrected, by the correction means, according to at least one of the work posture of the working equipment and the work load on the working equipment, and therefore, the drive torque of the drive unit that drives the swing motor becomes a drive torque with the work posture of the working equipment or the work load on the working equipment taken into account, while maintaining the system that the drive torque of the drive unit for driving the swing motor is controlled by the control means such that a difference between a target rotation speed for the swing motor as outputted responsive to manipulation of the swing control device and an actual rotation speed sensed by the actual rotation speed sensor is reduced to zero. Therefore, the swing speed control of the swing motor driven by the drive torque of the drive unit can be performed as control with the work posture of the working equipment or the work load on the working equipment being taken into account.

The swing control system according to the present invention may also be characterized in that in the invention described above, the correction means further corrects the target rotation speed based on the actual rotation speed of the swing motor as sensed by the actual rotation speed sensor.

According to the present invention constructed as described above, a shock at the time of a start-up of the swing motor or vibrations due to fluctuations in speed during a stop can be effectively suppressed to achieve more stable control by correcting the target rotation speed for the swing motor, which has been outputted responsive to the manipulation of the swing control device, with a correction value based on the drive torque of the drive unit and a correction value based on the actual rotation speed sensed by the actual rotation speed sensor.

The swing control system according to the present invention may also be characterized in that in the invention described above, the swing control system is provided with a signal detector for detecting a signal value commensurate with a rotation speed of the swing motor, said rotation speed corresponding to a drive torque of the drive unit, and the correction means comprises at least one of a combination of a work posture sensor for sensing the work posture and a first computing means for computing a coefficient of a magnitude corresponding to the work posture sensed by the work posture sensor and a second combination of a work load sensor for sensing the work load and a second computing means for computing a coefficient of a magnitude corresponding to the work load sensed by the work load sensor, and further comprises a correction-value computing unit for multiplying the signal value outputted from the signal detector and the coefficient outputted from the first computing means or second computing means to output a correction value for correcting the target rotation speed.

The swing control system according to the present invention may also be characterized in that in the invention described above, the work posture sensor for the first computing means is to sense a working radius of the working equipment, and the first computing means comprises one that calculates a large value as the coefficient when the working radius is small but calculates a small value as the coefficient when the working radius is large.

The swing control system according to the present invention may also be characterized in that in the invention described above, the second computing means comprises one that calculates a large value as the coefficient when the work load is small but calculates a small value as the coefficient when the work load is large.

The swing control system according to the present invention may also be characterized in that in the invention described above, the swing control system is provided with a correction value indicator capable of outputting, by manipulation, a preset value for correcting the target rotation speed outputted from the swing control device and a third computing means for computing a coefficient corresponding to a magnitude of the preset value outputted from the correction value indicator, and upon manipulation of the correction value indicator, the correction value computing unit outputs a correction value determined based on the coefficient calculated by the third computing means.

Advantageous Effects of the Invention

According to the present invention, the swing control system, which is provided with the control means for controlling a drive torque of the drive unit for driving the swing motor to obtain an actual rotation speed corresponding to a target rotation speed outputted from the swing control device, is provided with the correction means for correcting the target rotation speed, which has been outputted from the swing control device, based on a drive torque of the drive unit as corrected according to at least one of the work posture of the working equipment and the work load on the working equipment. Therefore, swing control with the work posture of the working equipment or the work load on the working equipment taken into account can be realized while maintaining the control system that the actual rotation speed follows the target rotation speed for the swing motor as outputted responsive to the manipulation of the swing control device. As a consequence, the performance of control by the operator, who sits on the upperstructure and manipulates the swing control device, and the performance of work carried out by the working equipment can be brought into conformity with the actual situation of the work, thereby making it possible to improve the performance of control by the operator and the performance of work by the working equipment over the conventional ones.

MODES FOR CARRYING OUT THE INVENTION

The present invention will hereinafter be described based on embodiments of the swing control system according to the present invention for the working machine.

Figure 1:
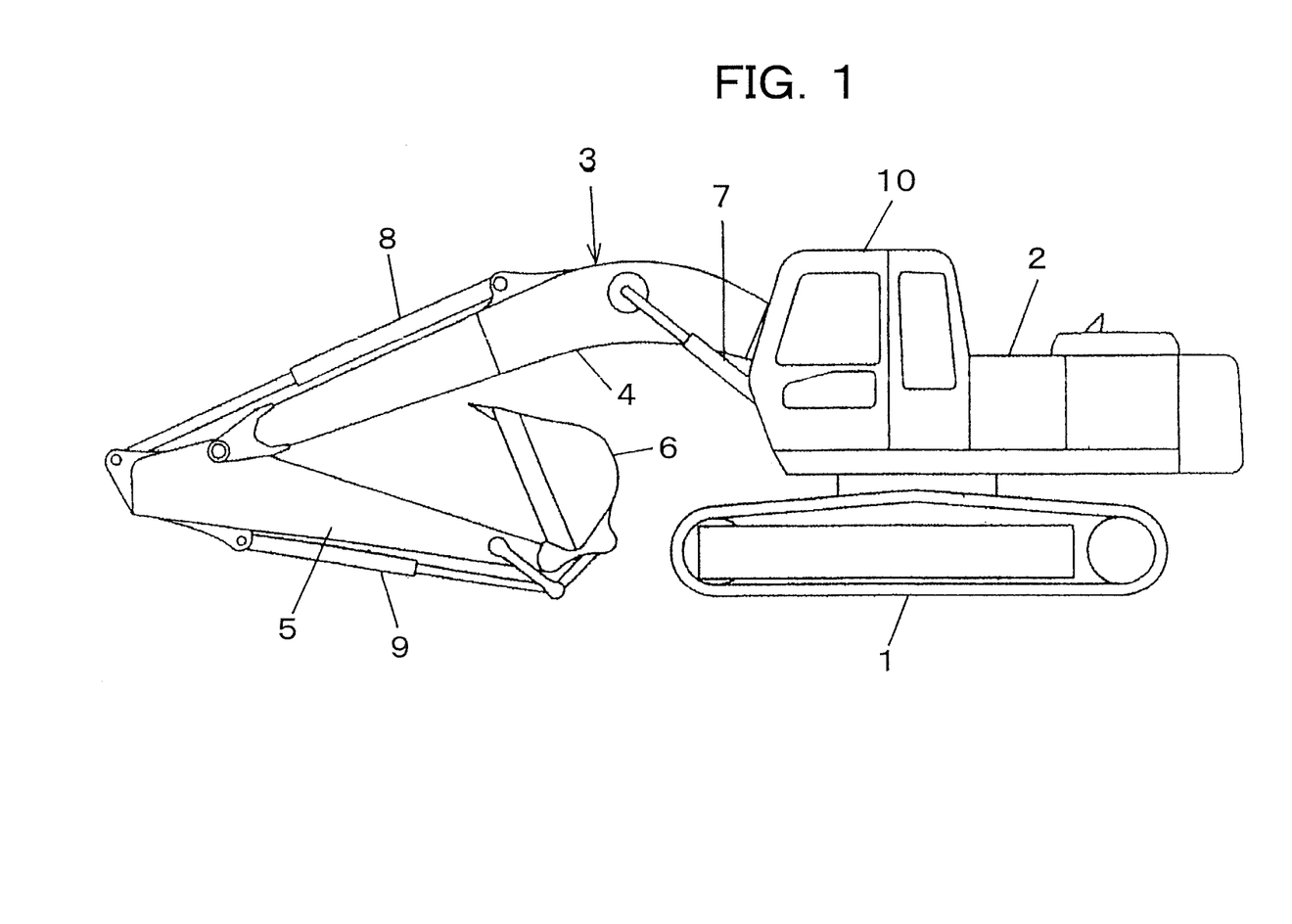
FIG. 1 is a side view showing a hydraulic excavator as an example of a working machine on which the swing control system according to the present invention can be arranged.

FIG. 1 is a side view showing a hydraulic excavator as an example of the working machine in which the swing control system according to the present invention can be arranged.

The hydraulic excavator shown in FIG. 1 is provided with a travel base 1, an upperstructure 2 mounted on the travel base 1 and a front working mechanism, in other words, working equipment 3 attached to the upperstructure 2. The working equipment 3 includes a boom 4 attached pivotally in an up-and-down direction to the upperstructure 2, an arm 5 attached pivotally to the boom 4, and a bucket attached pivotally to the arm 5. This working equipment 3 also includes hydraulic cylinders such as a boom cylinder 7 for operating the boom 4, an arm cylinder 8 for operating the arm 5, and a bucket cylinder 9 for operating the bucket 6. At a forward position on the upperstructure 10, an operator's cab 10 is arranged.

Figure 2:
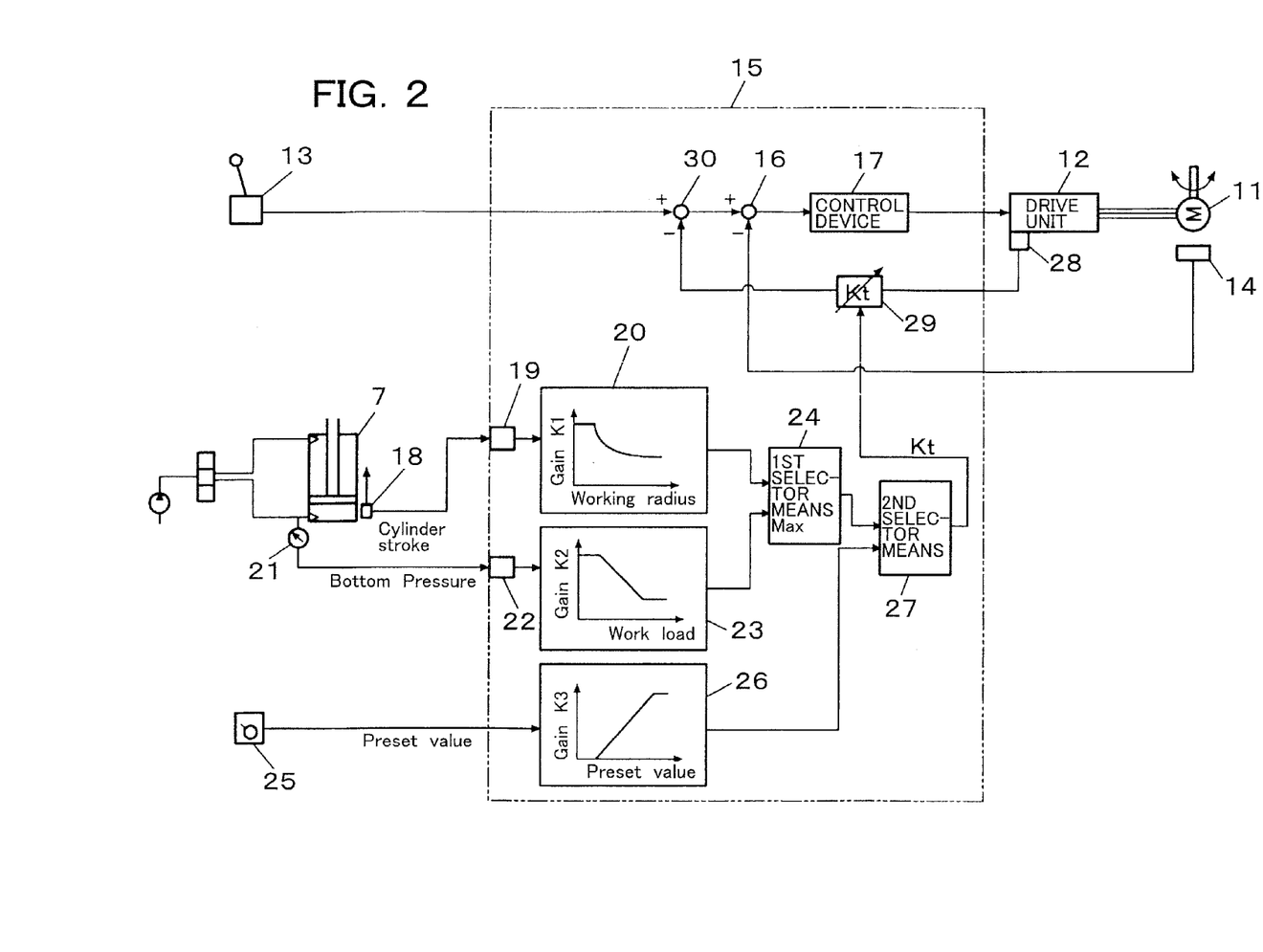
FIG. 2 is a circuit block diagram depicting one embodiment of the swing control system according to the present invention as arranged on the hydraulic excavator shown in FIG. 1.

FIG. 2 is a circuit block diagram depicting one embodiment of the swing control system according to the present invention as arranged on the hydraulic excavator shown in FIG. 1.

As depicted in FIG. 2, the above-described hydraulic excavator is also provided with an electric motor as a swing motor 11 for rotating the upperstructure 2, an inverter as a drive unit 12 for driving the swing motor 11, and a swing control device 13 arranged in the operator's cab 10 to output a target rotation speed for the swing motor 11, said target rotation speed being of a value corresponding to a control stroke of the swing control device 13.

The swing control system according to this embodiment is provided with an actual rotation speed sensor 14 for sensing an actual rotation speed of the swing motor 11, and a control means as a controller 15 for controlling a drive torque of the drive unit 12, which drives the swing motor 11, such that a difference between the target rotation speed for the swing motor 11 as outputted from the swing control device 13 and the actual rotation speed outputted from the actual rotation speed sensor 14 is reduced to zero.

The swing control system according to this embodiment is also provided with a correction means for correcting the target rotation speed for the swing motor 11, which has been outputted from the swing control device 13, according to at least one of a work posture of the working equipment 3 and a work load on the working equipment 3, for example, according to both of these work posture and work load. To sense the drive torque of the drive unit 12 for driving the swing motor 11, the swing control system according to this embodiment is also provided with a signal detector 28 for detecting a signal value commensurate with a rotation speed of the swing motor 11, said rotation speed corresponding to the drive torque, and outputting the signal value to the controller 15.

The above-described correction means includes at least one of a combination of a work posture sensor for sensing the work posture and a first computing means 20 for computing a coefficient of a magnitude corresponding to the work posture sensed by the work posture sensor and a second combination of a work load sensor for sensing the work load and a second computing means 23 for computing a proportionality coefficient of a magnitude corresponding to the work load sensed by the work load sensor, for example, both of the combinations in this embodiment. The above-described work posture sensor is to sense, for example, a working radius of the working equipment 3, and comprises a stroke sensor 18 for sensing a stroke of a boom cylinder 18, which operates the boom 4 included in the working equipment 3, and outputting it to the controller 15. The above-described load sensor comprises a pressure sensor 21 for detecting, for example, a bottom pressure of the boom cylinder 7 and outputting it to the controller 15.

In the controller 15, there is arranged a function generator 19, in which correlations between cylinder strokes of the boom cylinder 7 and working radii of the working equipment 3 have been set beforehand to output, to the first computing means 20, a working radius commensurate with a signal outputted from the stroke sensor 18. In the controller 15, there is also arranged another function generator 22, in which correlations between bottom pressures of the boom cylinder 7 and work loads have been set beforehand to output, to the second computing means 23, a work load commensurate with a signal outputted from the pressure sensor 21.

As also depicted in FIG. 2, the first computing means 20 comprises one that calculates a coefficient, specifically a gain K1 of a large value when the working radius of the working equipment 3 is small but calculates a coefficient, specifically a gain K1 of a small value when the working radius is large and outputs the gain K1. The second computing means 23 comprises one that calculates a proportionality coefficient, specifically a gain K2 of a large value when the work load is small but calculates a proportionality coefficient, specifically a gain K2 of a small value when the work load is large and outputs the gain K2. The controller 15 is also provided with a first selector means 24 for selecting and outputting the larger one of the gain K1 outputted from the first computing means 20 and the gain K2 outputted from the second computing means 23.

In this embodiment, a correction value indicator 25 is also arranged, for example, in the operator's cab 10. This correction value indicator 25 can output, by manipulation, a preset value for correcting the target rotation speed outputted from the swing control device 13. In the controller 15, a third computing means 26 is also arranged. This third computing means 26 calculates and outputs a proportionality coefficient corresponding to the magnitude of the preset value outputted from the correction value indicator 25, specifically a gain K3 the value of which becomes larger as the preset value increases.

In the controller 15, a second selector means 27 is also arranged. This second selector means 27 selects the relevant one of the gain K1 or gain K2 outputted from the first selector means 24 and the gain K3 outputted from the third computing means 26 and outputs it as a gain Kt. The second selector means 27 preferentially outputs, for example, the gain K3 when this gain K3 has been outputted from the third computing means 26. When the gain K3 has not been outputted from the third computing means 26, the relevant one of the gain K1 and gain K2, said relevant one having been outputted from the first selector means 24, is outputted. Also arranged, for example, in the controller 15 is an unillustrated determination means that determines whether or not the preset value has been inputted in the third computing means 26 from the correction value indicator 25.

The controller 15 is also provided with a correction-value computing unit 29. This correction-value computing unit 29 multiplies the above-described signal value—which has been outputted from the signal detector 28 and is commensurate with the rotation speed of the swing motor 11, said rotation speed corresponding to the drive torque of the drive unit 12 for driving the swing motor 11—and the gain Kt outputted from the second selector means 27, in other words, the relevant one of the gains K1 and K2 which are the coefficients outputted from the first computing means 20 and second computing means 23, respectively. As an alternative, the correction-value computing unit 29 multiplies the above-described signal value and the gain K3 which is the coefficient outputted from the third computing means 26. Based on the product of the multiplication, the correction-value computing unit 29 outputs a correction value for correcting the target rotation speed for the swing motor 11 as having been outputted from the swing control device 13. Further arranged in the controller 15 is a subtractor 30 that subtracts the correction value, which has been outputted from the correction-value computing unit 29, from the target rotation speed outputted from the swing control device 13.

Still further arranged in the controller 15 is another subtractor 16 and a control device 17. The subtractor 16 computes the difference between the corrected target rotation speed outputted from the subtractor 30 and the actual rotation speed sensed by the actual rotation speed sensor 14. The control device 17 outputs, to the drive unit 12, a drive torque corresponding to a rotation speed outputted from the subtractor 16. This control device 17 comprises, for example, one capable of performing PI control. As an alternative, the control device 17 may comprise one capable of performing general proportional control or PID control.

Figure 3:
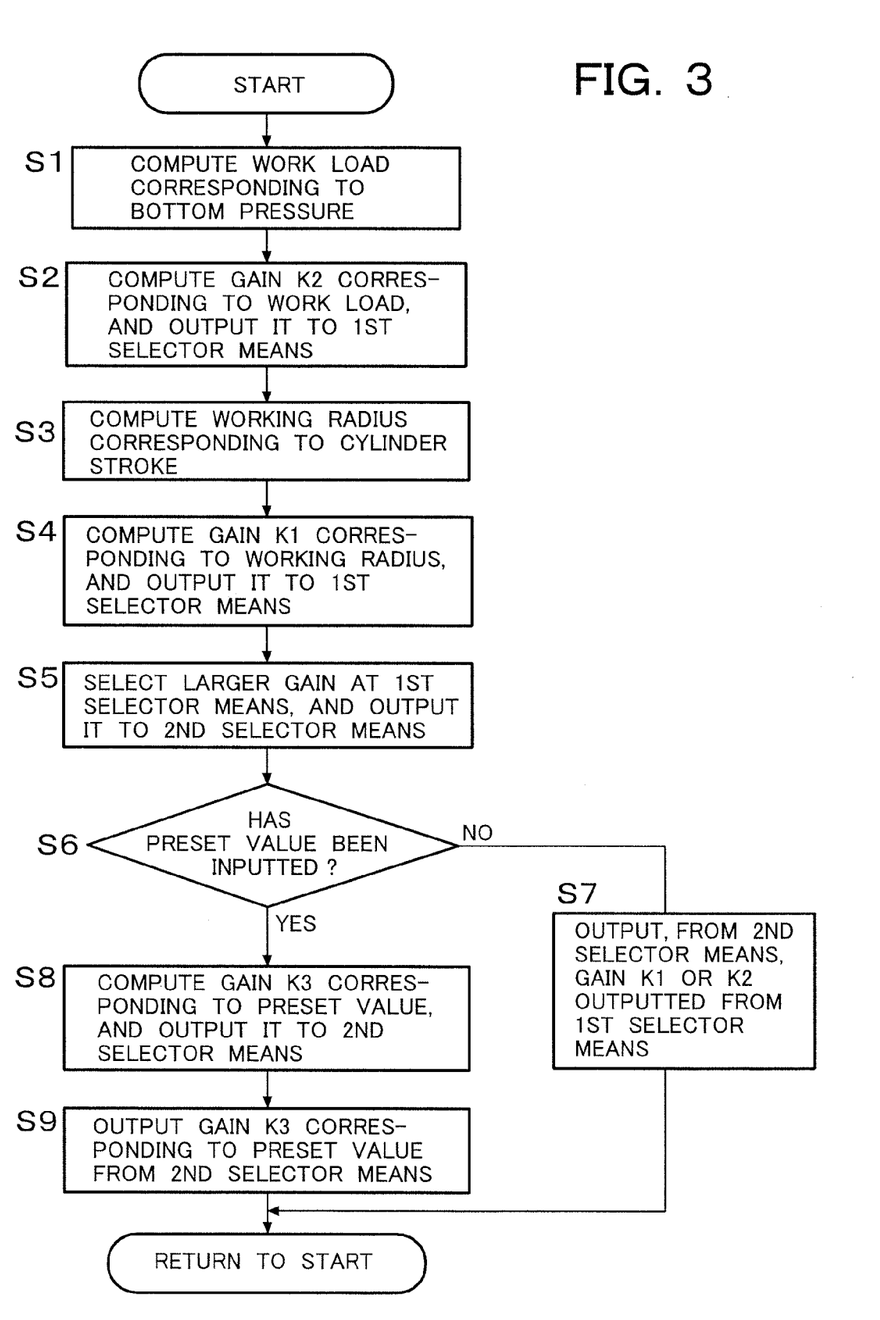
FIG. 3 is a flow chart illustrating essential processing steps at a controller arranged in the first embodiment depicted in FIG. 2.

FIG. 3 is a flow chart illustrating essential processing steps at a controller arranged in the first embodiment depicted in FIG. 2. An operation of the swing control system according to this embodiment constructed as described above will hereinafter be described centering around processing at the controller 15.

Now assume, for example, that the working equipment 3 is used as a rigging crane and the operator in the operator's cab 10 has manipulated the swing control device 13 to perform suspending work. A difference between a target rotation speed for the swing motor 11 as having been outputted from the swing control device 13 and an actual rotation speed of the swing motor 11 as having been sensed by the actual rotation speed sensor 14 is computed by the subtractor 16, and a drive torque is outputted from the control device 17 to the drive unit 12 such that the difference is reduced to zero. Therefore, the swing motor 11 is driven basically at a rotation speed corresponding to the target rotation speed outputted from the swing control device 13. As a result of the drive by the swing motor 11, the upperstructure 2 with the operator's cab 10 mounted thereon rotates at a swing speed corresponding to the control stroke of the swing control device 13, and the suspending work is performed by way of the working equipment 3. In this state, however, the drive torque is outputted to the drive unit such that the difference between the target rotation speed for the swing motor 11 and the actual rotation speed of the swing motor 11 is reduced to zero. If the swing control device 13 is quickly manipulated or is manipulated over a large control stroke, for example, the difference between the target rotation speed and the actual rotation speed, therefore, becomes large. As a consequence, a large drive torque is quickly outputted to realize the target rotation speed. Accordingly, there is a potential problem that a large shock may occur at a start-up of the swing motor. To overcome such a potential problem, correction of the target rotation speed is performed based on the drive torque as will be described hereinafter.

During such suspending work, the bottom pressure of the boom cylinder 7 is sensed by the pressure sensor 21, and the cylinder stroke of the boom cylinder 7 is sensed by the stroke sensor 18. Now, reference is also had to FIG. 3. At the controller 15, a work load corresponding to the bottom pressure sensed by the pressure sensor 21 is computed, and the computed work load is outputted to the second computing means (step S1). At the second computing means 23, a gain K2 corresponding to the work load is calculated and outputted to the first selector means 23 (step S2). At the function generator 19, on the other hand, a working radius corresponding to the cylinder stroke sensed by the stroke sensor 18 is computed, and the computed working radius is outputted to the first computing means 20 (step S3). At the first computing means 20, a gain K1 corresponding to the working radius is calculated and outputted to the first selector means 24 (step S4). At the first selector means 24, the larger one of the gain K1 outputted from the first computing means 20 and the gain K2 outputted from the second computing means 23 is selected, and is outputted to the second selector means 27 (step S5).

Here, it is determined by the unillustrated determination means arranged in the controller 15 whether or not a preset value has been inputted in the third computing means 26 from the correction value indicator 25 (step S6). If no present value has been inputted yet from the correction value indicator 25 and the determination is "NO", the relevant one of the gains K1 and K2 as outputted from the first selector means is outputted as a gain Kt from the second selector means 27 to the correction-value computing unit 29 (step S7). If the present value has been inputted from the correction value indicator 25 and the determination in step S6 is "YES", on the other hand, a gain K3 corresponding to the preset value outputted from the correction value indicator 25 is calculated at the third computing means 26, and is outputted to the second selector means 27 (step S8). Further, this gain K3 is outputted as a gain Kt from the second selector means 27 to the correction-value computing unit 29 (step S9).

Subsequently, a signal value from the signal sensor 28, said signal value being commensurate with the rotation speed of the swing motor 11 which corresponds to the drive torque of the drive unit 12, and the gain Kt outputted from the second selector means 27 as mentioned above are multiplied at the correction-value computing unit 29 to obtain a correction value. This correction value is outputted to the subtractor 30. At this subtractor 30, the correction value outputted from the correction-value computing unit 29 is subtracted from the target rotation speed outputted from the swing control device 13, and the corrected target rotation speed is outputted to the subtractor 16. A computation at this subtractor 16 is as mentioned above. Specifically, the difference between the corrected target rotation speed for the swing motor 11 and the actual rotation speed of the swing motor 11 as sensed by the actual rotation speed sensor 14 is determined at the subtractor 16, and a drive torque is outputted from the control device 17 to the drive unit 12 such that the difference is reduced to zero.

If the suspended load is large, the bottom pressure sensed by the pressure sensor 21 is high, and the work load determined at the function generator 22 is large in the above-described suspending work, the gain K2 calculated at the second computing means 22 has a relatively small value. Assuming that this gain K2 is outputted as the gain Kt to the correction-value computing unit 29 via the first selector means 24 and second selector means 27, the correction value to be calculated at the correction-value computing unit 29 will be the product of a signal value of a rotation speed, which is outputted from the signal sensor 28 and is commensurate with a large drive torque corresponding to the large work load, and the relatively small gain K2. As a consequence, the target rotation speed outputted from the swing control device 13 is subtracted by the product of the signal value of the rotation speed commensurate with the large drive torque and the relatively small gain K2. Even if the control lever of the swing control device 13 is manipulated to large extent, the rotation speed of the swing motor 11, therefore, does not increase much so that the rotation speed of the upperstructure 2 can be controlled slow and gentle.

If the suspended load is unloaded at a predetermined place and the working equipment 3 swings without load in the above-described suspending work, the suspended load becomes small and the bottom pressure sensed by the pressure sensor 21 becomes low. Therefore, the work load determined at the function generator 22 becomes small, and the gain K2 calculated at the second computing means 22 has a large value. Assuming that this gain K2 is outputted as the gain Kt to the correction-value computing unit 29 via the first selector means 24 and second selector means 27, the correction value calculated at the correction-value computing unit 29 is the product of a signal value of a rotation speed, which is outputted from the signal sensor 28 and is commensurate with a small drive torque corresponding to the small work load outputted from the signal detector 28, and the large gain K2. As a consequence, the target rotation speed outputted from the swing control device 13 is subtracted by a correction value, i.e., the product of the signal value of the rotation speed commensurate with the small drive torque and the large gain K2. Even if the control lever of the swing control device 13 is manipulated to large extent, the rotation speed of the swing motor 11, therefore, does not increase much as in the above-described case in which the weight of the suspended load is large. As a consequence, the rotation speed of the upperstructure 2 can be controlled slow and gentle. The operator is, therefore, allowed to perform suspending work without an odd feel by performing control such that the rotation speed of the upperstructure 2 upon making a swing while suspending down a load of large suspended load and the rotation speed of the upperstructure 2 upon making a swing while suspending an empty load do not change much from each other.

As has been described above, even if the swing control device 13 is manipulated to large extent, the swing motor 11 rotates at a somewhat reduced rotation speed commensurate with the corrected target rotation speed for the swing motor 11, the upperstructure 2 smoothly rotates at a rotation speed corresponding to the corrected target rotation speed while undergoing a gentle speed change, and as a result of this rotation, the suspending work by the working equipment 3, including suspension of an empty load, can be performed while avoiding the occurrence of large swaying of the suspended load.

If, upon making a swing, for example, in digging work or the like performed with the radius of the working equipment 5 set large different from the above-described suspending work, the cylinder stroke sensed by the stroke sensor 18 is large and the working radius determined at the function generator 19 is large, the gain K1 calculated at the first computing means 20 has a relatively small value. Assuming that this gain K1 is outputted as the gain Kt to the correction-value computing unit 29 via the first selector means 24 and second selector means 27, the correction value calculated at the correction-value computing unit 29 is the product of a signal value of a rotation speed, which is outputted from the signal sensor 28 and is commensurate with a large drive torque corresponding to the large working radius, and the relatively small gain K1. As a consequence, the target rotation speed outputted from the swing control device 13 is subtracted by a correction value, i.e., the product of the signal value of the rotation speed commensurate with the large drive torque and the relatively small gain K1. Even if the control lever of the swing control device 13 is manipulated to large extent, the rotation speed of the swing motor 11, therefore, does not increase much. As a consequence, the rotation speed of the upperstructure 2 can be controlled slow and gentle.

If, upon making a swing in digging work or the like performed under a work load equal to that in the above-described digging work with the radius of the working equipment 5 set small, the cylinder stroke sensed by the stroke sensor 18 is small and the working radius determined at the function generator 19 is small, the gain K1 calculated at the first computing means 20 has a large value. Assuming that this gain K1 is outputted as the gain Kt to the correction-value computing unit 29 via the first selector means 24 and second selector means 27, the correction value calculated at the correction-value computing unit 29 is the product of a signal value of a rotation speed, which is outputted from the signal sensor 28 and is commensurate with a small drive torque corresponding to the small working radius, and the large gain K1. As a consequence, the target rotation speed outputted from the swing control device 13 is subtracted by a correction value, i.e., the product of the signal value of the rotation speed commensurate with the small drive torque and the large gain K1. Even if the control lever of the swing control device 13 is manipulated to large extent, the rotation speed of the swing motor 11, therefore, does not increase much. As a consequence, the rotation speed of the upperstructure 2 can be controlled slow and gentle. The operator is, therefore, allowed to perform digging work or the like without an odd feel by performing control such that the rotation speed of the upperstructure 2 in the digging work or the like with the working radius of the working equipment 3 being set large and the rotation speed of the upperstructure 2 in the digging work or the like with the working radius of the working equipment 3 being set small do not change much from each other.

As has been described above, even if the swing control device 13 is manipulated to large extent, the swing motor 11 rotates at a somewhat reduced rotation speed commensurate with the corrected target rotation speed for the swing motor 11, the upperstructure 2 smoothly rotates at a rotation speed corresponding to the corrected target rotation speed while undergoing a gentle speed change, and as a result of this rotation, the digging work or the like by the working equipment 3 can be performed without causing large vibrations or the like on the working equipment 5 or upperstructure 2.

It is to be noted that the correlation between control stroke of the swing control device 13 and rotation speed of the upperstructure 2 can be maintained as desired by the operator because the gain K3 corresponding to the preset value outputted from the correction value indicator 25 is fed to the correction-value computing unit 29 as mentioned above when the correction value indicator 25 is manipulated by the operator.

According to the swing control system of this embodiment constructed as described above, the target rotation speed outputted from the swing control device 13 is corrected according to the working radius of the working equipment 3 and the work load on the working equipment 3 by the correction means, which includes the first computing means 20, second computing means 23, third computing means 26, correction-value computing unit 29 and the like, while maintaining the system that the drive torque of the drive unit 12 for driving the swing motor 11 is controlled by the controller 15 such that the difference between the target rotation speed for the swing motor 11 as outputted responsive to manipulation of the swing control device 13 and the actual rotation speed sensed by the actual rotation speed sensor 14 is reduced to zero. Therefore, the drive torque of the drive unit 12 that drives the swing motor 11 becomes a drive torque with the working radius of the working equipment 3 and the work load on the working equipment 3 taken into account. Accordingly, the swing speed control of the swing motor 11 driven by the drive torque of the drive unit 12 can be performed as control with the working radius of the working equipment 3 and the work load on the working equipment 3 being taken into account. As a consequence, the performance of control by the operator, who sits on the upperstructure 2 and manipulates the swing control device 13, and the performance of work carried out by the working equipment 3 can be brought into conformity with the actual situation of the work, thereby making it possible to improve the performance of control by the operator and the performance of work by the working equipment 3.

Figure 4:
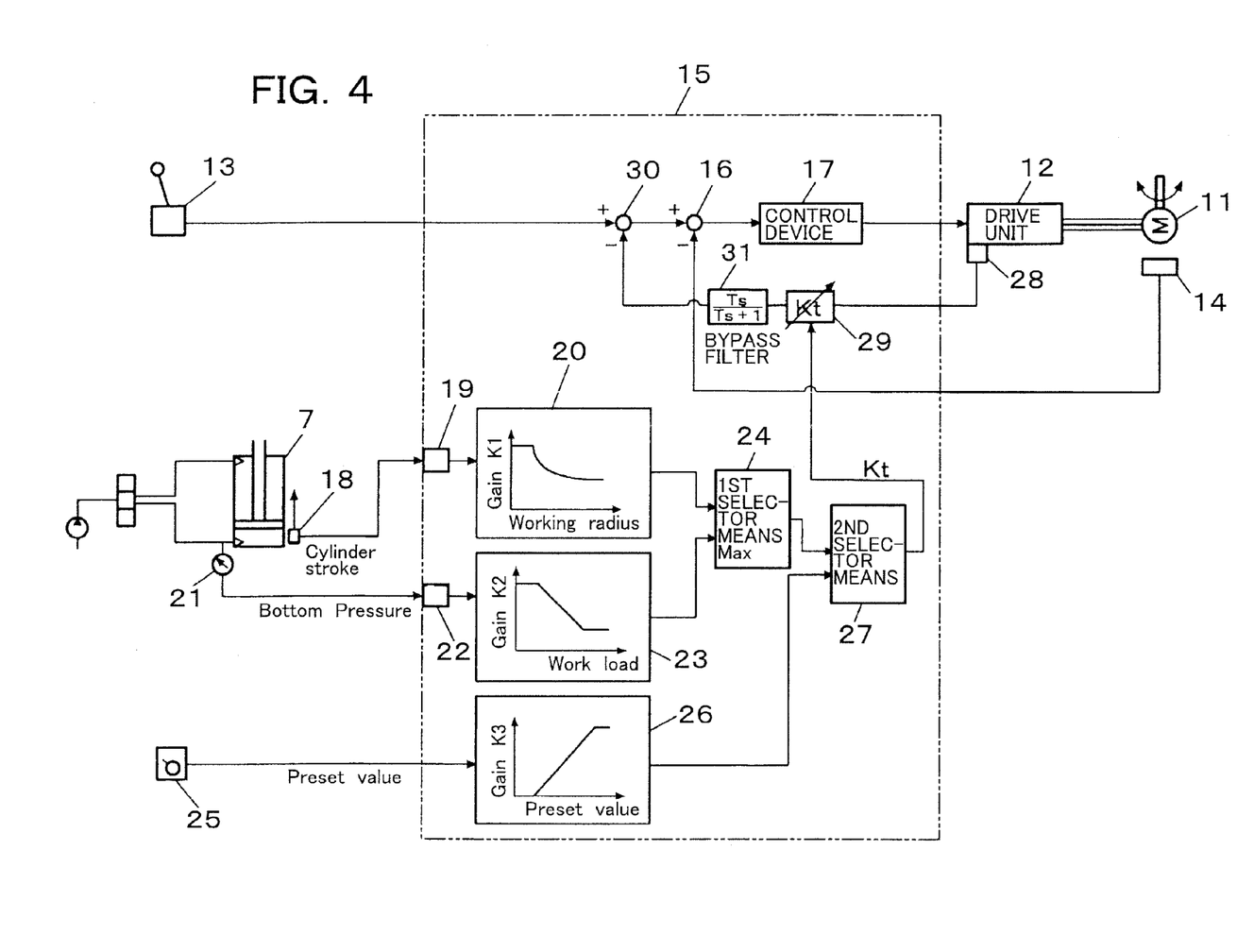
FIG. 4 is a circuit block diagram depicting another embodiment of the swing control system according to the present invention.

FIG. 4 is a circuit block diagram depicting another embodiment of the swing control system according to the present invention. This another embodiment has the construction that, in order to remove any influence by a constant load produced during working on sloping ground, during work performed in a situation of exposure to the wind or during like work, a highpass filter 31 capable of removing any constant load component is arranged before or after the correction-value computing unit 29, for example, between the correction-value computing unit 29 and the subtractor 30. The remaining construction is the same as the above-described embodiment.

According to the another embodiment constructed as described above, it is possible to remove any constant load produced during working on sloping ground, during work performed in a situation of exposure to the wind or during like work. Correction of still higher accuracy can, therefore, be realized on the target rotation speed outputted from the swing control device 13, thereby making it possible to further improve the control of the rotation speed of the upperstructure 2 relative to the control stroke of the swing control device 5, in other words, the control performance by the operator and the work performance by the working equipment 3.

Figure 5:
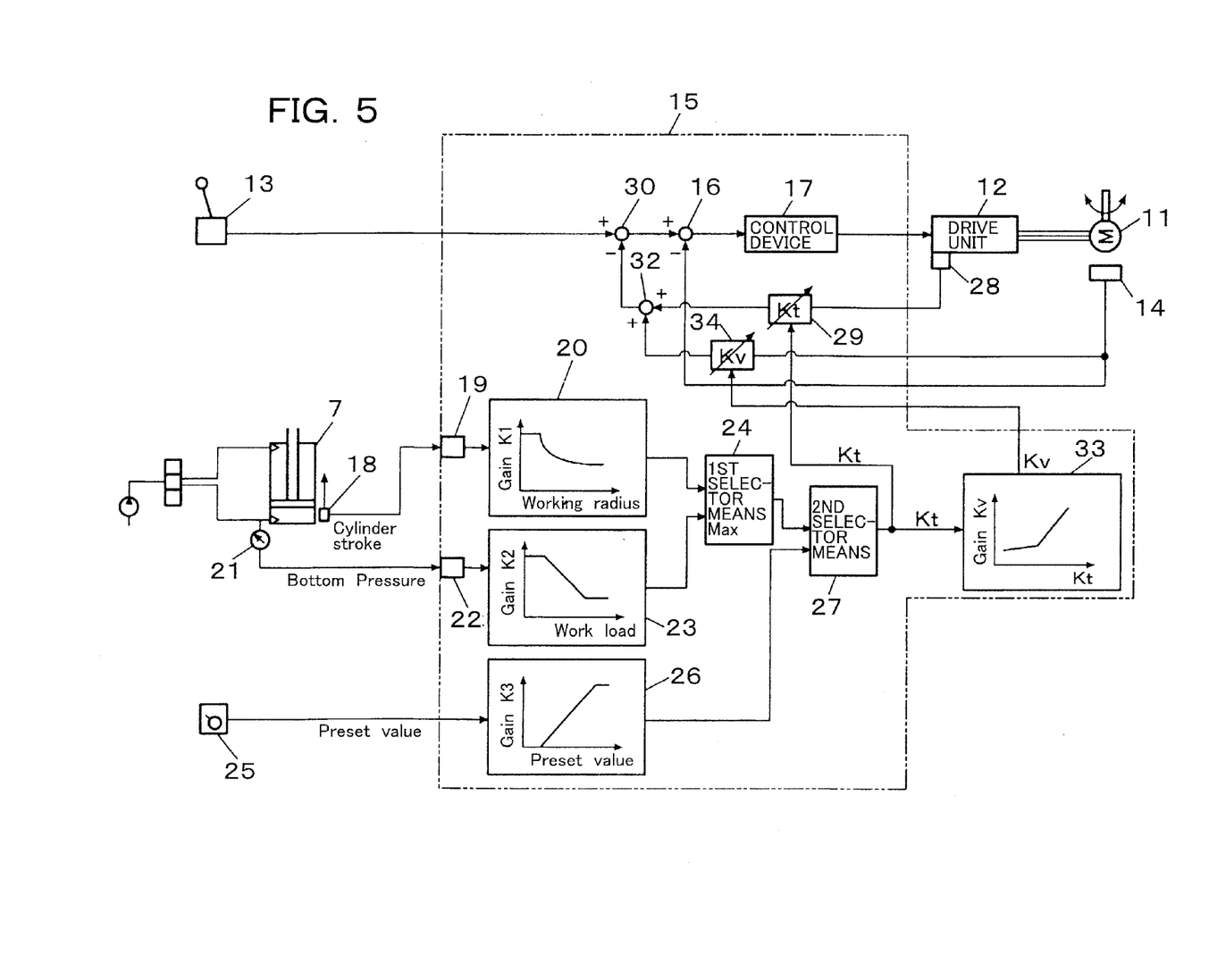
FIG. 5 is a circuit block diagram depicting a further embodiment of the swing control system according to the present invention.

FIG. 5 is a circuit block diagram depicting a further embodiment of the swing control system according to the present invention. In this further embodiment, an adder 32 is arranged before or after the correction-value computing unit 29, for example, between the correction-value computing unit 29 and the subtractor 30. In addition, the actual rotation speed sensed by the actual rotation speed sensor 14 is multiplied by a gain Kv, which has been computed by a fourth computing means 33, at a correction-value computing unit 34 to further calculate another correction value, and the thus-calculated another correction value and a correction value calculated by the correction-value computing unit 29 are added by the adder 32 to calculate a new correction value. The gain Kv computed by the fourth computing means 33 is to set a gain Kv that becomes greater corresponding to the gain Kt outputted, for example, from the second selector means 27. The remaining construction is the same as the above-described embodiment depicted in FIG. 2. As a consequence, the new correction value which is subtracted by the subtractor 30 can reflect the actual state of rotation of the swing motor 11, thereby making it possible to more effectively reduce (attenuate) a shock or vibrations at the time of a start-up or stop of the swing motor 11. It is to be noted that between the correction-value computing unit 29 and highpass filter 31 depicted in FIG. 4, the adder 32 may also be arranged to add the correction value calculated by the correction-value computing unit 34.

In this embodiment, the fourth computing means 33 is arranged to calculate the gain Kv based on the gain Kt selected by the second selector means 27. It is, however, possible to calculate the gain Kv based on the gains K1, K2 and K3 calculated by the first computing means 20, second computing means 23 and third computing means 26, respectively.

LEGEND

2 Upperstructure
3 Working equipment
4 Boom
7 Boom cylinder (hydraulic cylinder)
10 Operator's cab
11 Swing motor
12 Drive unit
13 Swing control device
14 Actual rotation speed sensor
15 Controller (control means)
16 Subtractor
17 Control device
18 Stroke sensor (work posture sensor)
19 Function generator
20 First computing means
21 Pressure sensor (work load sensor)
22 Function generator
23 Second computing means
24 First selector means
25 Correction value indicator
26 Third computing means
27 Second selector means
28 Signal detector
29 Correction-value computing unit
30 Subtractor
31 Highpass filter
32 Adder
33 Fourth computing means
34 Correction-value computing unit

The invention claimed is:

1. A swing control system for a working machine having an upperstructure, working equipment attached to the upperstructure, a swing motor for rotating the upperstructure, a drive unit for driving the swing motor, and a swing control device for outputting a target rotation speed for the swing motor, said target rotation speed corresponding to a control stroke of the swing control device, said swing control system being arranged on the working machine and being provided with an actual rotation speed sensor for sensing an actual rotation speed of the swing motor and a control unit for controlling a drive torque of the drive unit such that a difference between the target rotation speed outputted from the swing control device and the actual rotation speed outputted from the actual rotation speed sensor is reduced to zero, the swing control system comprising:
 a correction device for correcting the target rotation speed, which has been outputted from the swing control device, based on a drive torque of the drive unit as corrected according to at least one of a work posture of the working equipment and a work load on the working equipment, wherein
  the swing control system is provided with a signal detector for detecting a signal value corresponding to a drive torque of the drive unit, and
  the correction device comprises at least one of a combination of a work posture sensor for sensing the work posture and a first computing unit for computing a coefficient of a magnitude corresponding to the work posture sensed by the work posture sensor and a second combination of a work load sensor for sensing the work load and a second computing unit for computing a coefficient of a magnitude corresponding to the work load sensed by the work load sensor, and further comprises a correction-value computing unit for multiplying the signal value outputted from the signal detector and the coefficient outputted from the first computing unit or second computing unit to output a correction value for correcting the target rotation speed.

2. The swing control system according to claim 1, wherein:
 the correction device further corrects the target rotation speed based on the actual rotation speed of the swing motor as sensed by the actual rotation speed sensor.

3. The swing control system according to claim 1, wherein:
 the work posture sensor for the first computing unit is to sense a working radius of the working equipment, and the first computing unit comprises one that calculates a large value as the coefficient when the working radius is small but calculates a small value as the coefficient when the working radius is large.

4. The swing control system according to claim 3, wherein:
 the swing control system is provided with a correction value indicator capable of outputting, by manipulation, a preset value for correcting the target rotation speed outputted from the swing control device and a third computing unit for computing a coefficient corresponding to a magnitude of the preset value outputted from the correction value indicator, and upon manipulation of the correction value indicator, the correction value computing unit outputs a correction value determined based on the coefficient calculated by the third computing unit.

5. The swing control system according to claim 1, wherein:
 the second computing unit comprises one that calculates a large value as the coefficient when the work load is small but calculates a small value as the coefficient when the work load is large.

6. The swing control system according to claim 5, wherein:
 the swing control system is provided with a correction value indicator capable of outputting, by manipulation, a preset value for correcting the target rotation speed outputted from the swing control device and a third computing unit for computing a coefficient corresponding to a magnitude of the preset value outputted from the correction value indicator, and upon manipulation of the correction value indicator, the correction value computing unit outputs a correction value determined based on the coefficient calculated by the third computing unit.

7. The swing control system according to claim 1, wherein:
the swing control system is provided with a correction value indicator capable of outputting, by manipulation, a preset value for correcting the target rotation speed outputted from the swing control device and a third computing unit for computing a coefficient corresponding to a magnitude of the preset value outputted from the correction value indicator, and upon manipulation of the correction value indicator, the correction value computing unit outputs a correction value determined based on the coefficient calculated by the third computing unit.

* * * * *